United States Patent
Zhu

(10) Patent No.: US 11,856,571 B2
(45) Date of Patent: Dec. 26, 2023

(54) INFORMATION FEEDBACK METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 420 days.

(21) Appl. No.: 17/290,225

(22) PCT Filed: Oct. 31, 2018

(86) PCT No.: PCT/CN2018/113011
§ 371 (c)(1),
(2) Date: Apr. 29, 2021

(87) PCT Pub. No.: WO2020/087348
PCT Pub. Date: May 7, 2020

(65) Prior Publication Data
US 2021/0385823 A1 Dec. 9, 2021

(51) Int. Cl.
*H04W 72/12* (2023.01)
*H04L 1/1607* (2023.01)
(Continued)

(52) U.S. Cl.
CPC ....... *H04W 72/1215* (2013.01); *H04L 1/1678* (2013.01); *H04L 5/0053* (2013.01); *H04W 72/21* (2023.01)

(58) Field of Classification Search
CPC ............ H04W 72/1215; H04W 72/21; H04W 74/0808; H04W 72/20; H04W 72/02;
(Continued)

(56) References Cited

U.S. PATENT DOCUMENTS 10,645,730 B2 * 5/2020 Cao .................. H04W 72/23
10,701,677 B2 * 6/2020 Park .................. H04W 72/0446
(Continued)

FOREIGN PATENT DOCUMENTS

CN 106130702 A 11/2016
CN 106301739 A 1/2017
(Continued)

OTHER PUBLICATIONS

European Patent Office, Extended European Search Report Issued in Application No. 18938739.2, dated Sep. 21, 2021, Germany, 7 pages.
(Continued)

*Primary Examiner* — Lana N Le
(74) *Attorney, Agent, or Firm* — Arch & Lake LLP

(57) ABSTRACT

An information feedback method and apparatus are provided. The method includes: receiving a scheduling instruction from a base station that configures multiple unlicensed channel resources for a terminal, where the scheduling instruction carries information for the terminal to determine a first transmission position for feeding back a hybrid automatic repeat request (HARQ), and the first transmission position is on a first unlicensed channel resource; obtaining the first transmission position according to the scheduling instruction, and detecting whether the first transmission position is in an available state; when detecting the first transmission position is in a non-available state, determining a second transmission position for feeding back the HARQ, where the second transmission position is on a second unlicensed channel resource; and when detecting the second transmission position is in the available state, sending information on HARQ feedback to the base station at the second transmission position.

19 Claims, 9 Drawing Sheets

(51) Int. Cl.
*H04L 5/00* (2006.01)
*H04W 72/21* (2023.01)

(58) Field of Classification Search
CPC ......... H04W 72/0446; H04W 72/0453; H04W 72/23; H04W 72/044; H04W 72/12; H04W 72/232; H04W 72/04; H04W 74/004; H04W 76/00; H04W 76/27; H04W 72/00; H04L 1/1678; H04L 5/0053; H04L 5/0055; H04L 1/1854; H04L 1/1806; H04L 1/1812
See application file for complete search history.

(56) References Cited

U.S. PATENT DOCUMENTS

| | | | | |
|---|---|---|---|---|
| 2017/0331577 | A1* | 11/2017 | Parkvall | H04L 5/0053 |
| 2017/0332358 | A1 | 11/2017 | Park et al. | |
| 2019/0141539 | A1* | 5/2019 | Yerramalli | H04L 5/0053 |
| 2019/0159251 | A1 | 5/2019 | Li et al. | |
| 2022/0022173 | A1* | 1/2022 | Oh | H04L 1/1854 |
| 2022/0116184 | A1* | 4/2022 | Sun | H04W 72/23 |

FOREIGN PATENT DOCUMENTS

| | | |
|---|---|---|
| CN | 106658724 A | 5/2017 |
| CN | 106658742 A | 5/2017 |
| CN | 107295664 A | 10/2017 |
| CN | 107332646 A | 11/2017 |

OTHER PUBLICATIONS

International Search Report issued in PCT Application No. PCT/CN2018/113011 dated Jul. 25, 2019 with English translation, (4p).
Huawei, HiSilicon,"HARQ enhancements in NR unlicensed", 3GPP TSG RAN WG1 Meeting #94, Gothenburg, Sweden, R1-1808063, Aug. 20-24, 2018, (8p).
ZTE,"Discussion on scheduling and HARQ for NR-U",3GPP TSG RAN WG1 Meeting #94, Gothenburg, Sweden, R1-1808323, Aug. 20-24, 2018, (4p).
Intel Corporation,"Enhancements to HARQ for NR-unlicensed",3GPP TSG RAN WG1 Meeting #94bis, Chengdu, China, R1-1810768, Oct. 8-12, 2018, 4 pages.
Qualcomm Incorporated,"Enhancements to Scheduling and HARQ operation for NR-U", 3GPP TSG RAN WG1 Meeting #94bis, Chengdu, China, R1-1811254, Oct. 6-12, 2018, (8p).
Xiaomi,"Discussion on the HARQ enhancement for NR-U",3GPP TSG RAN WG1 Meeting #94bis, Chengdu, China, R1-1811417, Oct. 8-12, 2018, (4p).
ISA State Intellectual Property Office of the People's Republic of China, Written Opinion of the International Searching Authority Issued in Application No. PCT/CN2018/113011, dated Jul. 25, 2019, (11p).
European Patent Office, Office Action Issued in Application No. 18938739.2, dated Sep. 6, 2022, Netherlands, 5 pages.
European Patent Office, Office Action Issued in Application No. 18938739.2, dated Apr. 18, 2023, Netherlands, 6 pages.
Indian Patent Office, Office Action Issued in Application No. 202147022103, dated Feb. 22, 2022, 5 pages.

* cited by examiner

INFORMATION FEEDBACK METHOD AND APPARATUS

CROSS REFERENCE TO RELATED APPLICATIONS

The present application is the U.S. national phase application of PCT International Application No. PCT/CN2018/113011, filed on Oct. 31, 2018, the content of which is incorporated herein by reference in its entirety for all purposes.

TECHNICAL FIELD

The present disclosure relates to the field of communication technologies, and in particular, to an information feedback method and apparatus.

BACKGROUND

In next-generation communication systems, flexible configuration of multiple service types is to be supported. Further, different service types correspond to different service requirements. For example, an enhanced Mobile Broad Band (eMBB) service type has major requirements focusing on aspects such as large bandwidth and high data rate; an Ultra Reliable Low Latency Communication (URLLC) service type has major requirements focusing on high reliability and low latency; and a massive Machine Type Communication (mMTC) service type has major requirements focusing on a large number of connections. However, driven by service requirements, licensed spectrum alone cannot satisfy more service requirements in the next-generation communication systems.

SUMMARY

To overcome the problems in the related art, examples of the present disclosure provide an information feedback method and apparatus.

According to a first aspect of the examples of the present disclosure, an information feedback method is provided, and the method is applicable to a terminal for which a base station configures a plurality of unlicensed channel resources. The method includes that the terminal receives a scheduling instruction from the base station. The scheduling instruction carries information for the terminal to determine a first transmission position for feeding back a hybrid automatic repeat request (HARQ), and the first transmission position is on a first unlicensed channel resource.

Further, the method includes that the terminal obtains the first transmission position according to the scheduling instruction and detects whether the first transmission position is in an available state. The terminal determines a second transmission position for feeding back the HARQ in response to detecting that the first transmission position is in a non-available state. The second transmission position is on a second unlicensed channel resource. The terminal sends information on HARQ feedback to the base station at the second transmission position in response to detecting that the second transmission position is in the available state.

According to a second aspect of the examples of the present disclosure, an information feedback method is provided, and the method is applicable to a base station which configures a plurality of unlicensed channel resources for a terminal. The method includes that the base station configures a scheduling instruction for the terminal. The scheduling instruction carries information for the terminal to determine a first transmission position for feeding back an HARQ, and the first transmission position is on a first unlicensed channel resource.

Further, the method includes that the base station sends the scheduling instruction to the terminal, such that the terminal sends information on HARQ feedback to the base station at a second transmission position in response to determining that the first transmission position determined by the scheduling instruction is detected to be in a non-available state and the second transmission position determined for feeding back the HARQ is in an available state. The second transmission position is on a second unlicensed channel resource.

Moreover, the method includes that the base station receives the information on the HARQ feedback from the terminal.

According to a third aspect of the examples of the present disclosure, an information feedback apparatus is provided. The apparatus includes a processor and a memory storing instructions executable by the processor. The processor is configured to receive a scheduling instruction from the base station. The scheduling instruction carries information for the terminal to determine a first transmission position for feeding back an HARQ, and the first transmission position is on a first unlicensed channel resource.

The processor is further configured to obtain the first transmission position according to the scheduling instruction and detect whether the first transmission position is in an available state. In response to detecting that the first transmission position is in a non-available state, the processor is configured to determine a second transmission position for feeding back the HARQ. The second transmission position is on a second unlicensed channel resource. Moreover, in response to detecting that the second transmission position is in the available state, the processor is configured to send information on HARQ feedback to the base station at the second transmission position.

According to a fourth aspect of the examples of the present disclosure, information feedback apparatus is provided. The apparatus includes a processor and a memory storing instructions executable by the processor. The processor is configured to implement the information feedback method according the second aspect.

According to a fifth aspect of the examples of the present disclosure, a non-transitory computer readable storage medium is provided, and the storage medium stores a computer program. The computer program is configured to execute the information feedback method according to the first aspect.

According to a sixth aspect of the examples of the present disclosure, a non-transitory computer readable storage medium is provided, and the storage medium stores a computer program. The computer program is configured to execute the information feedback method according to the second aspect.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
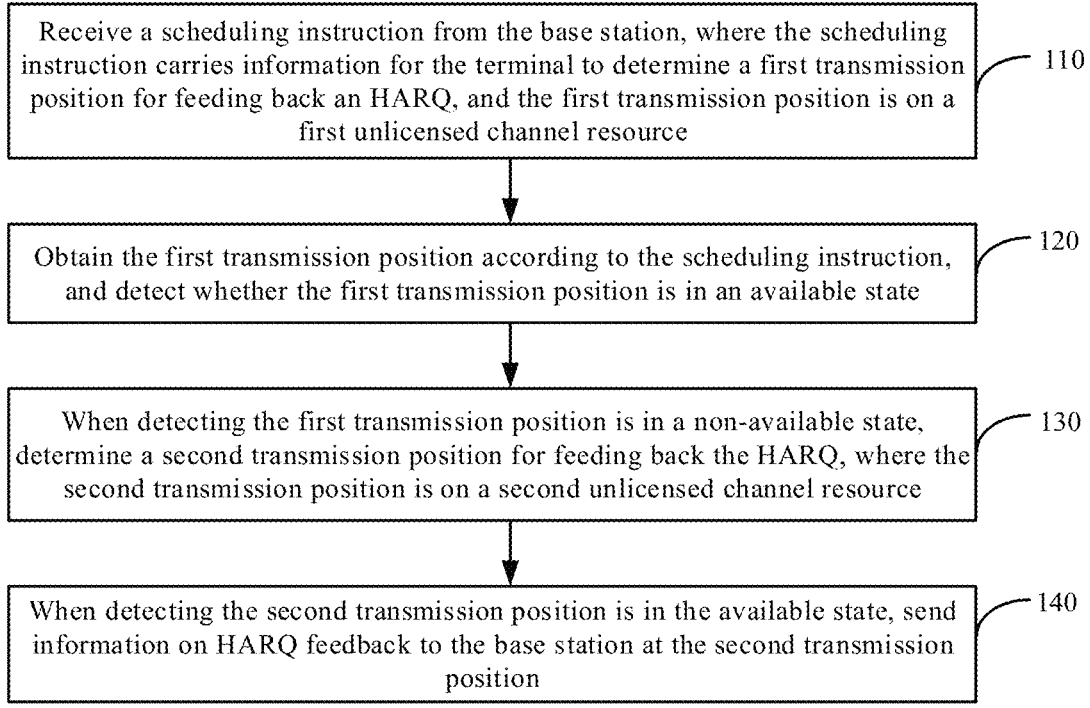
FIG. 1 is a flowchart illustrating an information feedback method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

Figure 2:
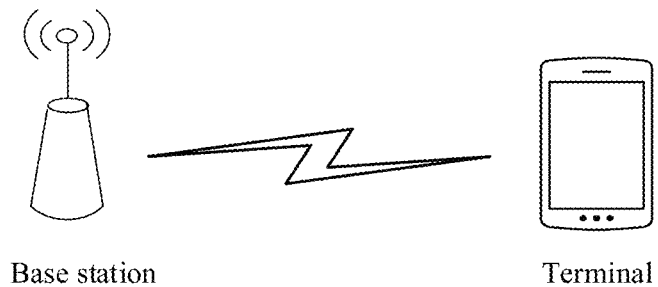
FIG. 2 is a diagram illustrating an application scenario of an information feedback method according to an example.

FIG. 1 is a flowchart illustrating an information feedback method according to an example. FIG. 2 is a diagram illustrating an application scenario of an information feedback method according to an example. The information feedback method is applicable to a terminal, where a base station configures a plurality of unlicensed channel resources for the terminal. As shown in FIG. 1, the information feedback method includes the following steps 110-140.

At step 110, a scheduling instruction is received from the base station, where the scheduling instruction carries information for the terminal to determine a first transmission position for feeding back a Hybrid Automatic Repeat reQuest (HARQ), and the first transmission position is on a first unlicensed channel resource.

In examples of the present disclosure, information feedback may refer to HARQ feedback from the terminal in response to downlink data received on the first unlicensed channel resource. A specific position at which the HARQ feedback is sent is determined by the terminal based on the scheduling instruction configured by the base station.

In an example, the information carried in the scheduling instruction for the terminal to determine the first transmission position for feeding back the HARQ may be the first transmission position on the first unlicensed channel resource, such that the terminal may directly obtain the first transmission position for feeding back the HARQ from the scheduling instruction. Alternatively, the information may be indication information indicating the first transmission position, such that the terminal may obtain the indication information from the scheduling instruction and then determine the first transmission position for feeding back the HARQ based on the indication information. A specific type of the information will not be redundantly described herein.

The first unlicensed channel resource may be an unlicensed channel resource currently used by the terminal, and the first transmission position may be a specified position on the first unlicensed channel resource, which is configured by the base station for the terminal and used for HARQ feedback.

At step 120, the first transmission position for feeding back the HARQ is obtained according to the scheduling instruction, and whether the first transmission position is in an available state is detected.

In examples of the present disclosure, the first transmission position may be in an available state or may be in a non-available state. If the first transmission position is in an available state, it indicates that the terminal is capable of sending information on HARQ feedback to the base station at the first transmission position. If the first transmission position is in a non-available state, it indicates that the terminal cannot send the information on the HARQ feedback to the base station at the first transmission position.

At step 130, when the first transmission position is detected to be in a non-available state, a second transmission position for feeding back the HARQ is determined, where the second transmission position is on a second unlicensed channel resource.

In examples of the present disclosure, when operating on an unlicensed spectrum, the channel occupation is unpredictable. In this way, if the terminal detects that the first transmission position is in an available state, the terminal can directly send the information on the HARQ feedback to the base station at the first transmission position; and if the terminal detects that the first transmission position is in a non-available state, the terminal further determines the second transmission position for feeding back the HARQ and sends the information on the HARQ feedback to the base station at the second transmission position. The first transmission position is on the first unlicensed channel resource and the second transmission position is on the second unlicensed channel resource. Moreover, the first unlicensed channel resource and the second unlicensed channel resource are different unlicensed channel resources.

In an example, a plurality of unlicensed channel resources configured by the base station for the terminal (for example, the first unlicensed channel resource or the second unlicensed channel resource) may include but not limited to the following three scenarios.

(1-1) A plurality of band width parts (BWPs) configured on one unlicensed carrier.

In this manner, the plurality of unlicensed channel resources configured by the base station for the terminal may be the plurality of BWPs on the unlicensed carrier. A BWP refers to contiguous resources on a band within a carrier.

(1-2) A plurality of unlicensed carriers.

In this manner, the plurality of unlicensed channel resources configured by the base station for the terminal may be the plurality of unlicensed carriers.

(1-3) A plurality of BWPs configured on a plurality of unlicensed carriers.

In this manner, the plurality of unlicensed channel resources configured by the base station for the terminal may be the plurality of BWPs on the plurality of unlicensed carriers. A BWP refers to contiguous resources on a band within a carrier.

At step 140, when the second transmission position is detected to be in the available state, the information on the HARQ feedback is sent to the base station at the second transmission position.

In examples of the present disclosure, if detecting the second transmission position is in an available state, the terminal can send HARQ backup feedback at the second transmission position; and if detecting that the second transmission position is in a non-available state, the terminal cannot send the HARQ backup feedback at the second transmission position.

Figure 3:
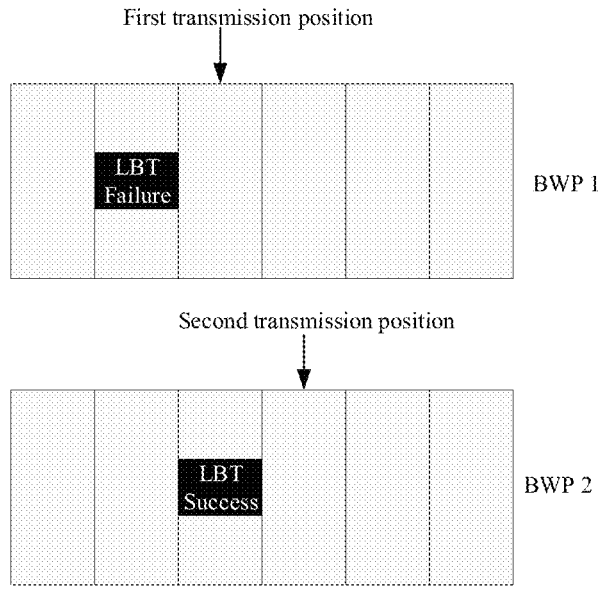
FIG. 3 is a schematic diagram illustrating a process of information feedback according to an example.

As shown in FIG. 2, an exemplary scenario includes a base station and a terminal. By referring to the schematic diagram of a process of information feedback in FIG. 3, the base station configures two BWPs on one unlicensed carrier for the terminal, which are BWP 1 and BWP 2 respectively. BWP 1 is an unlicensed channel resource currently used by the terminal, and the first transmission position is a specified position on BWP 1 configured by the base station for the terminal to perform HARQ feedback.

The terminal performs Listen Before Talk (LBT) detection on the first transmission position on BWP 1. If the detection result is failed LBT, it indicates that the first transmission position is in the non-available state, that is, the terminal will not successfully occupy the channel at the first transmission position, and the terminal further needs to determine the second transmission position for feeding back the HARQ, where the second transmission position is on BWP 2.

The terminal performs LBT detection on the second transmission position on BWP 2. If the detection result is successful LBT, it indicates that the second transmission position in the available state, and the terminal can send the information on the HARQ feedback to the base station at the second transmission position.

As seen in the above examples, the second transmission position for feeding back HARQ is determined when the first transmission position for feeding back the HARQ obtained according to the scheduling instruction is detected to be in the non-available state, where the first transmission position is on the first unlicensed channel resource and the second transmission position is on the second unlicensed channel resource; and when the second transmission position is detected to be in the available state, the information on the HARQ feedback is sent to the base station at the second transmission position, thereby realizing information feedback on an unlicensed channel resource and improving the reliability of the information feedback.

Figure 4:
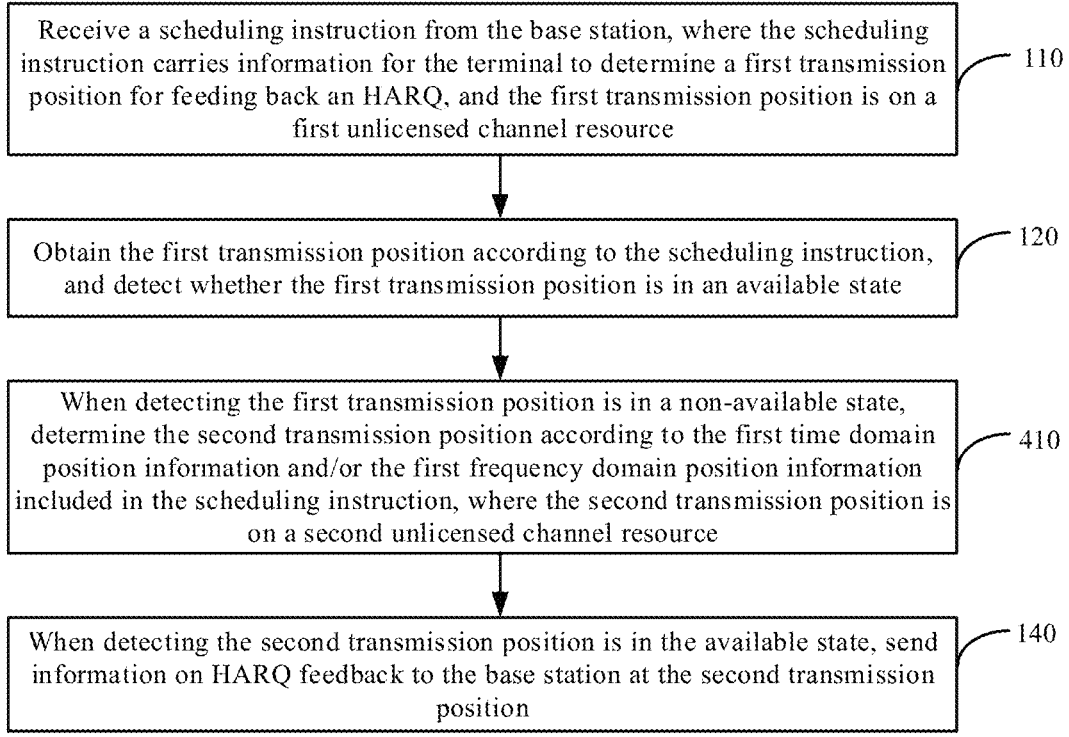
FIG. 4 is a flowchart illustrating another information feedback method according to an example.

FIG. 4 is a flowchart illustrating another information feedback method according to an example. The information feedback method may be applicable to a terminal. The method is based on the method shown in FIG. 1. The scheduling instruction includes first time domain position information and/or first frequency domain position information configured for the terminal by the base station to indicate the second transmission position. As shown in FIG. 4, when step 130 of determining the second transmission position for feeding back the HARQ is performed, the following step 410 may be included.

At step 410, the second transmission position is determined according to the first time domain position information and/or the first frequency domain position information included in the scheduling instruction.

In examples of the present disclosure, the first time domain position information can be time domain position information configured for the terminal by the base station to indicate the second transmission position, and the first frequency domain position information can be frequency domain position information configured for the terminal by the base station to indicate the second transmission position.

In an example, the first time domain position information and/or the first frequency domain position information in step 410 may be located at a fixed or configurable location of the scheduling instruction; and the first time domain position information and/or the first frequency domain position information may have a fixed or configurable length of information bits.

As can be seen from the examples, the second transmission position may be determined according to the first time domain position information and/or the first frequency domain position information included in the scheduling instruction, such that a transmission position for the HARQ backup feedback is determined according to the scheduling instruction from the base station and the flexibility of determining the transmission position for the HARQ backup feedback is improved.

Figure 5:
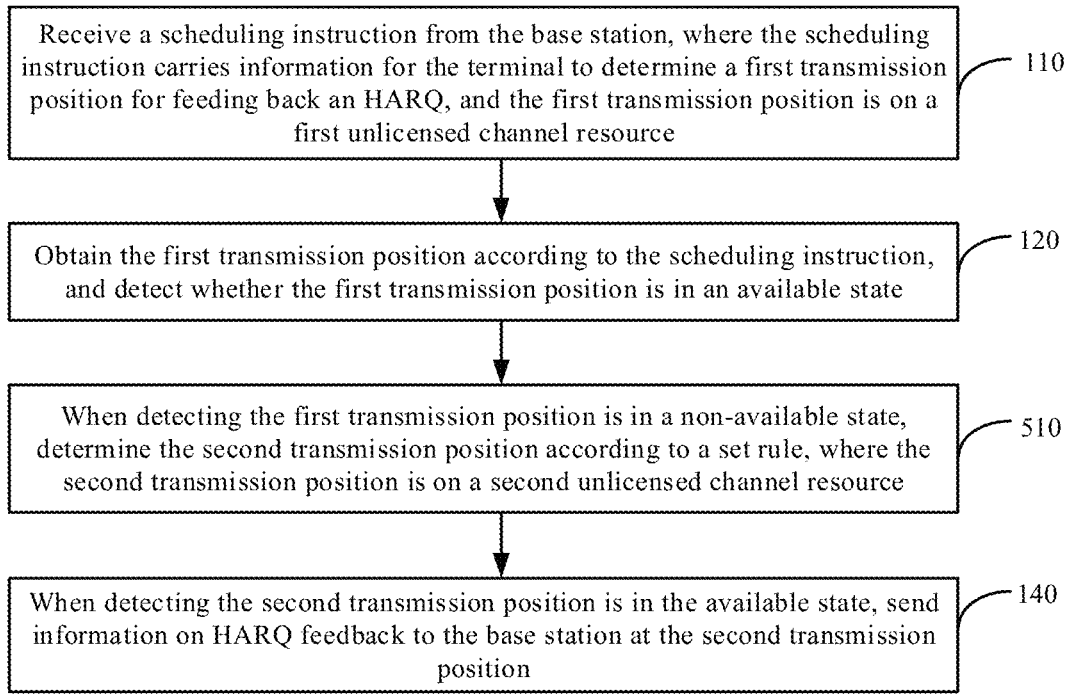
FIG. 5 is a flowchart illustrating another information feedback method according to an example.

FIG. 5 is a flowchart illustrating another information feedback method according to an example. The information feedback method may be applicable to be a terminal. The method is based on the method shown in FIG. 1. As shown in FIG. 5, when step 130 of determining the second transmission position for feeding back the HARQ is performed, the following step 510 may be included.

At step 510, the second transmission position is determined according to a set rule.

In an example of the present disclosure, the set rule may be preset by a base station according to actual situations. The terminal may automatically determine the second transmission position on the second unlicensed channel resource according to the set rule.

In an example, the set rule may be predefined, for example, predefined in a protocol. Alternatively, the set rule may be configured by the base station for the terminal and notified to the terminal via a system message or specified signaling. The specified signaling may include at least one of the followings: (1) Radio Resource Control (RRC) signaling; (2) Media Access Control-Control Element (MAC-CE) signaling; or (3) physical layer signaling.

In an example, the set rule at step 510 may include but not limited to the following three circumstances.

In a first circumstance, the set rule includes a first correspondence between second unlicensed channel resource and specified time length, where a specified time length refers to a time interval between the first transmission position on the first unlicensed channel resource for HARQ feedback and the second transmission position on the second unlicensed channel resource for HARQ backup feedback.

In this circumstance, step 510 may include the following.

(2-1) Second time domain position information for determining the second transmission position is obtained according to the first correspondence.

(2-2) The second transmission position is determined according to the obtained second time domain position information.

In a second circumstance, the set rule includes a second correspondence between second unlicensed channel resource and specified frequency offset value, where a specified frequency offset value refers to a frequency domain offset value between the first transmission position on the first unlicensed channel resource for HARQ feedback and the second transmission position on the second unlicensed channel resource for HARQ backup feedback.

In this circumstance, step 510 may include the following.

(3-1) Second frequency domain position information for determining the second transmission position is obtained according to the second correspondence.

(3-2) The second transmission position is determined according to the obtained second frequency domain position information.

In a third circumstance, the set rule includes the first correspondence in the first circumstance and the second correspondence in the second circumstance.

In this circumstance, step 510 may include the following.

(4-1) Second time domain position information for determining the second transmission position is obtained according to the first correspondence; and second frequency domain position information for determining the second transmission position is obtained according to the second correspondence.

(4-2) The second transmission position is determined according to the obtained second time domain position information and the obtained second frequency domain position information.

As can be seen from the examples, the second transmission position on the second unlicensed channel resource may be determined according to the set rule, thereby improving efficiency of determining the transmission position for the HARQ backup feedback.

Figure 6:
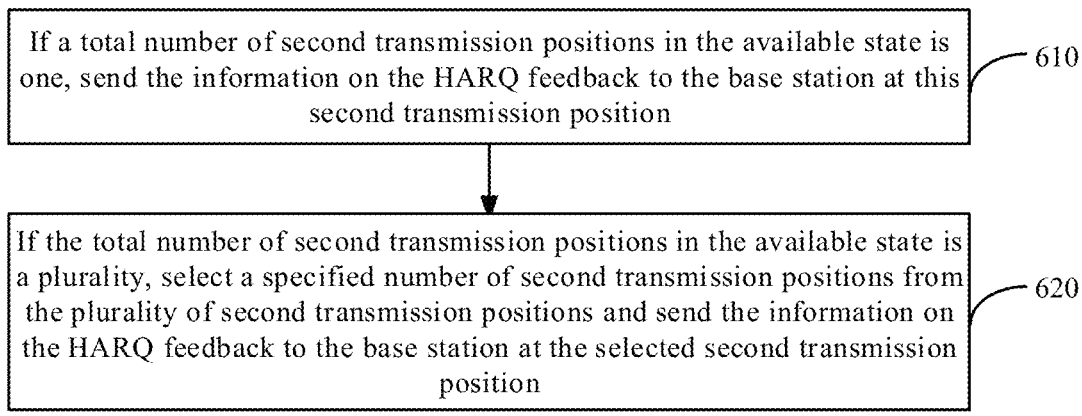
FIG. 6 is a flowchart illustrating another information feedback method according to an example.

FIG. 6 is a flowchart illustrating another information feedback method according to an example. The information feedback method may be applicable to a terminal. The method is based on the method shown in FIG. 1. As shown in FIG. 6, step 130 may include the following steps 610-620.

At step 610, if a total number of second transmission positions in the available state is one, the information on the HARQ feedback is sent to the base station at this second transmission position.

In examples of the present disclosure, no matter what method is used to determine the second transmission position on the second unlicensed channel resource for the HARQ backup feedback, if there is only one second transmission position in the available state, the information on the HARQ feedback is sent to the base station at that second transmission position. The second transmission position is used to characterize a specified position for sending HARQ backup feedback, and second transmission positions corresponding to different unlicensed channel resources can be different.

For example, the base station configures three BWPs, e.g., BWP 1, BWP 2 and BWP 3 on one unlicensed carrier for the terminal:
  a first transmission position on BWP 1 is in a non-available state;
  a second transmission position on BWP 2 is in a non-available state; and
  a second transmission position on BWP 3 is in an available state.

At this time, the terminal can send the information on the HARQ feedback to the base station at the second transmission position on BWP 3.

At step 620, if the total number of second transmission positions in the available state is a plurality, a specified number of second transmission positions are selected from the plurality of second transmission positions, and the information on the HARQ feedback is sent to the base station at the selected second transmission position.

In examples of the present disclosure, no matter what method is used to determine the second transmission position on the second unlicensed channel resource for HARQ backup feedback, if there are a plurality of second transmission positions in the available state, one or more second transmission positions may be selected, and the information on the HARQ feedback is sent to the base station at the selected second transmission positions.

In an example, the specified number in step 620 may be 1, or may be greater than 1 and smaller than or equal to the total number.

For example, the base station configures three BWPs, e.g., BWP 1, BWP 2 and BWP 3 on one unlicensed carrier for the terminal:
  a first transmission position on BWP 1 is in a non-available state;
  a second transmission position on BWP 2 is in an available state; and
  a second transmission position on BWP 3 is in an available state.

At this time, the terminal may send the information on the HARQ feedback to the base station at the second transmission position on BWP 2 or the second transmission position on BWP 3, and may also send the information on the HARQ feedback to the base station at the second transmission position on BWP 2 and the second transmission position on BWP 3, where the second transmission position on BWP 2 and the second transmission position on BWP 3 are different transmission positions.

As can be seen from the above examples, if the total number of second transmission positions in the available state is one, the information on the HARQ feedback is sent to the base station at that second transmission position; and if the total number of second transmission positions in the available state is more than one, a specified number of second transmission positions are selected from the more than one second transmission positions and the information on the HARQ feedback is sent to the base station at the selected one or more second transmission positions, thereby providing security of information feedback and improving practicability of the information feedback.

Figure 7:
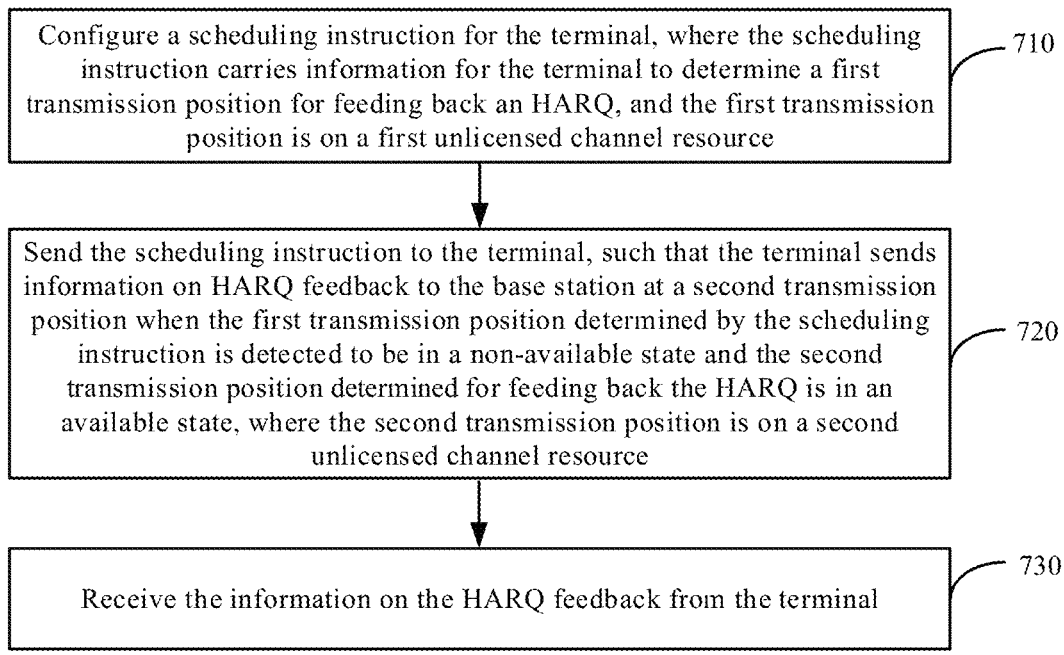
FIG. 7 is a flowchart illustrating an information feedback method according to an example.

FIG. 7 is a flowchart illustrating an information feedback method according to an example. The information feedback method is applicable to a base station which configures a plurality of unlicensed channel resources for a terminal. As shown in FIG. 7, the information feedback method includes the following steps 710-730.

At step 710, a scheduling instruction is configured for the terminal, where the scheduling instruction carries information for the terminal to determine a first transmission position for feeding back an HARQ, and the first transmission position is on a first unlicensed channel resource.

In examples of the present disclosure, information feedback may refer to HARQ feedback from the terminal in response to downlink data received on the first unlicensed channel resource. The base station informs the terminal about a specific position at which the HARQ feedback is sent via the scheduling instruction.

In an example, the information carried in the scheduling instruction for the terminal to determine the first transmission position for feeding back the HARQ may be the first transmission position on the first unlicensed channel resource, such that the terminal may directly obtain the first transmission position for feeding back the HARQ from the scheduling instruction. Alternatively, the information may be indication information indicating the first transmission position, such that the terminal may obtain the indication information from the scheduling instruction and then determine the first transmission position for feeding back the HARQ based on the indication information.

The first unlicensed channel resource may be an unlicensed channel resource currently used by the terminal, and the first transmission position may be a specified position on the first unlicensed channel resource, which is configured by the base station for the terminal and used for HARQ feedback.

In an example, the scheduling instruction in step 710 may include first time domain position information and/or first frequency domain position information configured for the terminal by the base station to indicate a second transmission position. In an example, the first time domain position information and/or the first frequency domain position information is located at a fixed or configurable position on the scheduling instruction; and the first time domain position information and/or the first frequency domain position information has a fixed or configurable length of information bits.

In this case, the base station configures the first time domain position information and/or the first frequency domain position information for the terminal, such that the terminal can determine a second transmission position based on the first time domain position information and/or the first frequency domain position information configured by the base station when the terminal detects that the first transmission position on the first unlicensed channel resource designated for HARQ feedback is in a non-available state.

In an example, a plurality of unlicensed channel resources configured by the base station for the terminal (for example, the first unlicensed channel resource or the second unlicensed channel resource) may include but not limited to the following three scenarios.

(5-1) A plurality of BWPs configured on one unlicensed carrier.

In this manner, the plurality of unlicensed channel resources configured by the base station for the terminal may be the plurality of BWPs on the unlicensed carrier. A BWP refers to contiguous resources on a band within a carrier.

(5-2) A plurality of unlicensed carriers.

In this manner, the plurality of unlicensed channel resources configured by the base station for the terminal may be the plurality of unlicensed carriers.

(5-3) A plurality of BWPs configured on a plurality of unlicensed carriers.

In this manner, the plurality of unlicensed channel resources configured by the base station for the terminal may be the plurality of BWPs on the plurality of unlicensed carriers. A BWP refers to contiguous resources on a band within a carrier.

At step 720, the scheduling instruction is sent to the terminal, such that the terminal sends information on HARQ feedback to the base station at a second transmission position when the first transmission position determined by the scheduling instruction is detected to be in a non-available state and the second transmission position determined for feeding back HARQ is in an available state, where the second transmission position is on a second unlicensed channel resource.

At step 730, the information on the HARQ feedback is received from the terminal.

In examples of the present disclosure, the information on the HARQ feedback sent by the terminal may be received at the second transmission position on the second unlicensed channel resource.

As can be seen from the above examples, the scheduling instruction is configured for the terminal and sent to the terminal, such that the terminal sends the information on the HARQ feedback to the base station at the second transmission position when the first transmission position obtained by the scheduling instruction is detected to be in the non-available state and the second transmission position determined for feeding back HARQ is in the available state, where the second transmission position is on the second unlicensed channel resource. In this way, information feedback on an unlicensed channel resource is realized and reliability of the information feedback is improved.

Figure 8:
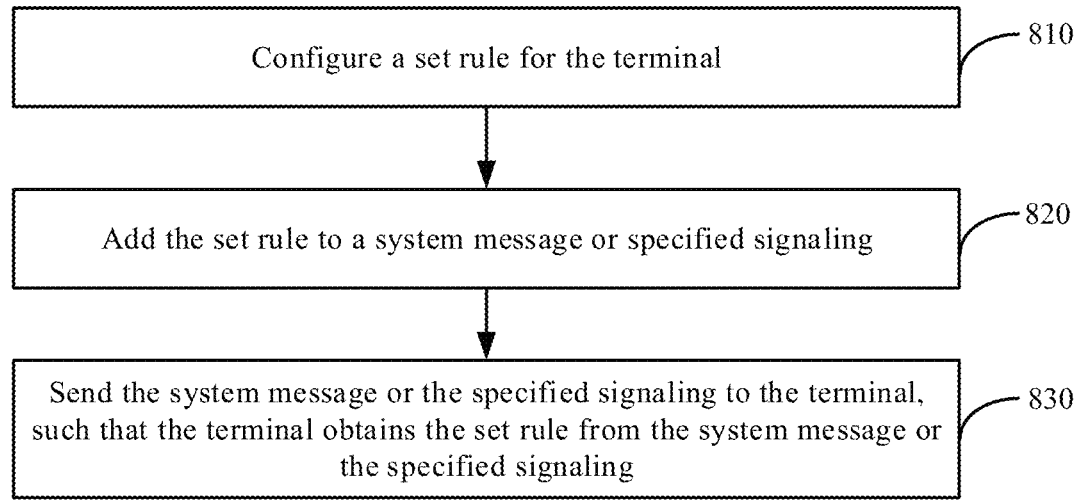
FIG. 8 is a flowchart illustrating another information feedback method according to an example.

FIG. 8 is a flowchart illustrating an information feedback method according to an example. The information feedback method may be applicable to a base station which configures a plurality of unlicensed channel resources for a terminal. The method is based on the method shown in FIG. 7. As shown in FIG. 8, the information feedback method may further include the following steps 810-830.

At step 810, a set rule is configured for the terminal. The set rule includes a first correspondence between second unlicensed channel resource and specified time length and/or a second correspondence between second unlicensed channel resource and specified frequency offset value. A specified time length refers to a time interval between the first transmission position on the first unlicensed channel resource for HARQ feedback and the second transmission position on the second unlicensed channel resource for HARQ backup feedback. A specified frequency offset value refers to a frequency domain offset value between the first transmission position on the first unlicensed channel resource for HARQ feedback and the second transmission position on the second unlicensed channel resource for HARQ backup feedback.

At step 820, the set rule is added to a system message or specified signaling.

In an example, the specified signaling may include at least one of the followings: (1) RRC signaling, (2) MAC-CE signaling, or (3) physical layer signaling.

At step 830, the system message or the specified signaling is sent to the terminal, such that the terminal obtains the set rule from the system message or the specified signaling.

As can be seen from the above examples, the set rule is configured for the terminal and added to the system message or the specified signaling, and then the system message or the specified signaling is sent to the terminal. Thus, the terminal can obtain the set rule from the system message or the specified signaling, and further determine the second transmission position on the second unlicensed channel resource for HARQ backup feedback according to the set rule. In this way, reliability of information feedback is improved.

Corresponding to the above examples of the information feedback methods, the present disclosure also provides examples of information feedback apparatuses.

Figure 9:
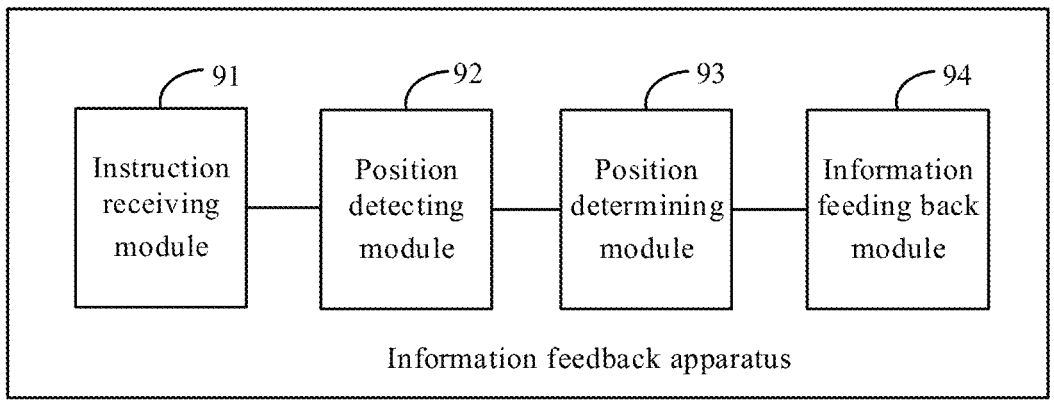
FIG. 9 is a block diagram illustrating an information feedback apparatus according to an example.

FIG. 9 is a block diagram illustrating an information feedback apparatus according to an example. The apparatus can be applicable to a terminal for which a base station configures a plurality of unlicensed channel resources and performs the information feedback method shown in FIG. 1. As shown in FIG. 9, the information feedback apparatus may include the following modules.

An instruction receiving module 91 is configured to receive a scheduling instruction from the base station, where the scheduling instruction carries information for the terminal to determine a first transmission position for feeding back an HARQ, and the first transmission position is on a first unlicensed channel resource.

A position detecting module 92 is configured to obtain the first transmission position according to the scheduling instruction, and detect whether the first transmission position is in an available state.

A position determining module 93 is configured to determine a second transmission position for feeding back the HARQ in response to detecting the first transmission position is in a non-available state, where the second transmission position is on a second unlicensed channel resource.

An information feeding back module 94 is configured to send information on HARQ feedback to the base station at the second transmission position in response to detecting the second transmission position is in the available state.

As can be seen from the examples, a second transmission position for feeding back HARQ is determined when a first transmission position obtained by the scheduling instruction for feeding back the HARQ is detected to be in a non-available state, where the first transmission position is on a first unlicensed channel resource and the second transmission position is on a second unlicensed channel resource. Further, when detecting the second transmission position is in an available state, information on HARQ feedback is sent to a base station at the second transmission position, thereby realizing information feedback on an unlicensed channel resource and improving reliability of the information feedback.

In an example, based on the apparatus shown in FIG. 9, the plurality of unlicensed channel resources include a plurality of BWPs configured on one unlicensed carrier, a plurality of unlicensed carriers, or a plurality of BWPs configured on a plurality of unlicensed carriers.

Figure 10:
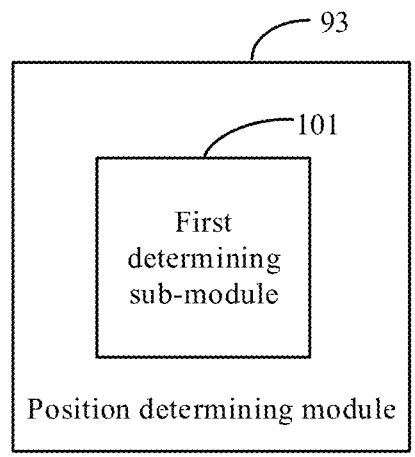
FIG. 10 is a block diagram illustrating another information feedback apparatus according to an example.

In an example, based on the apparatus shown in FIG. 9, as shown in FIG. 10, the scheduling instruction includes first time domain position information and/or first frequency domain position information configured for the terminal by the base station to indicate the second transmission position. The position determining module 93 may include:

a first determining sub-module 101 configured to determine the second transmission position according to the first time domain position information and/or the first frequency domain position information included in the scheduling instruction.

As can be seen from the examples, the second transmission position may be determined according to the first time domain position information and/or the first frequency domain position information included in the scheduling instruction from the base station, such that a transmission position of HARQ backup feedback is determined according to the scheduling instruction from the base station and the flexibility of determining the transmission position of the HARQ backup feedback is improved.

In an example, based on the apparatus shown in FIG. 10, the first time domain position information and/or the first frequency domain position information locates at a fixed or configurable position of the scheduling instruction; and t the first time domain position information and/or the first frequency domain position information has a fixed or configurable length of information bits.

Figure 11:
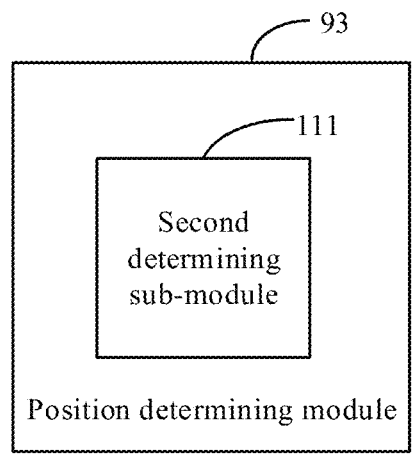
FIG. 11 is a block diagram illustrating another information feedback apparatus according to an example.

In an example, based on the apparatus shown in FIG. 9, as shown in FIG. 11, the position determining module 93 may include:

a second determining sub-module 111 configured to determine the second transmission position according to a set rule.

As can be seen from the examples, the second transmission position on the second unlicensed channel resource may be determined according to the set rule, thereby improving efficiency of determining a transmission position of HARQ backup feedback.

Figure 12:
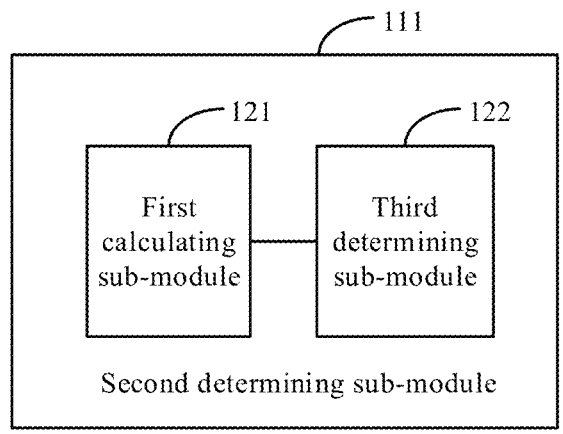
FIG. 12 is a block diagram illustrating another information feedback apparatus according to an example.

In an example, based on the apparatus shown in FIG. 11, as shown in FIG. 12, the set rule includes a first correspondence between second unlicensed channel resource and specified time length, and a specified time length refers to a time interval between the first transmission position on the first unlicensed channel resource for the HARQ feedback and the second transmission position on the second unlicensed channel resource for HARQ backup feedback, and the second determining sub-module 111 may include a first calculating sub-module 121 and a third determining sub-module 122.

The first calculating sub-module 121 is configured to obtain second time domain position information for determining the second transmission position according to the first correspondence and/or obtain second frequency domain position information for determining the second transmission position according to a second correspondence.

The third determining sub-module 122 is configured to determine the second transmission position according to the obtained second time domain position information and/or the obtained second frequency domain position information.

Figure 13:
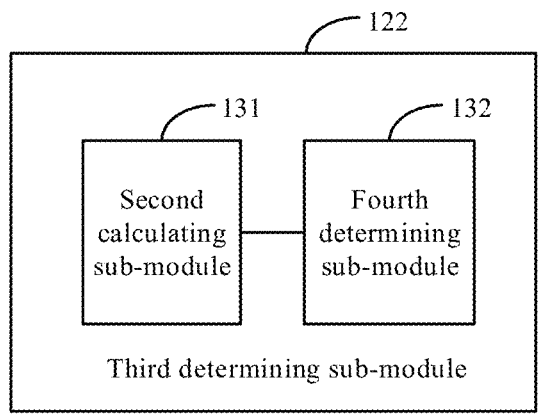
FIG. 13 is a block diagram illustrating another information feedback apparatus according to an example.

In an example, based on the apparatus shown in FIG. 12, as shown in FIG. 13, the set rule further includes a second correspondence between second unlicensed channel resource and specified frequency offset value, and a specified frequency offset value refers to a frequency domain offset value between the first transmission position on the first unlicensed channel resource for the HARQ feedback and the second transmission position on the second unlicensed channel resource for the HARQ backup feedback, and the third determining sub-module 122 may include a second calculating sub-module 131 and a fourth determining sub-module 132.

The second calculating sub-module 131 is configured to obtain the second frequency domain position information for determining the second transmission position according to the second correspondence.

The fourth determining sub-module 132 is configured to determine the second transmission position according to the obtained second time domain position information and the obtained second frequency domain position information.

In an example, based on the apparatus shown in FIG. 11, the set rule is predefined or configured by the base station for the terminal and notified to the terminal via a system message or specified signaling, and the specified signaling includes at least one of the followings: RRC signaling, MAC-CE signaling and physical layer signaling.

Figure 14:
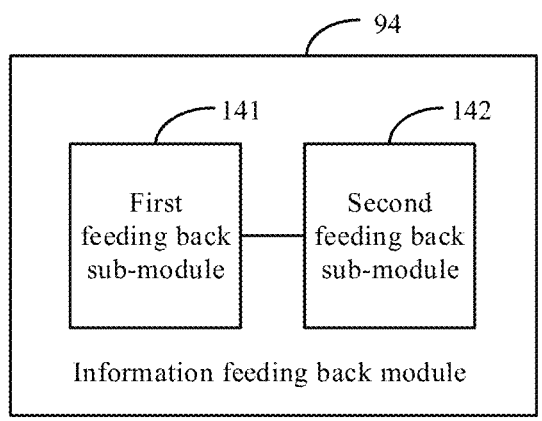
FIG. 14 is a block diagram illustrating another information feedback apparatus according to an example.

In an example, based on the apparatus shown in FIG. 9, as shown in FIG. 14, the information feeding back module 94 may include the following sub-modules.

A first feeding back sub-module 141 is configured to send, in response to that a total number of second transmission positions in the available state is one, information on HARQ feedback to the base station through the one second transmission position.

A second feeding back sub-module 142 is configured to select, in response to that the total number of second transmission positions in the available state is a plurality, a specified number of second transmission positions from the plurality of second transmission positions and send the information on the HARQ feedback to the base station at the selected second transmission position.

In an example, based on the apparatus shown in FIG. 14, the specified number is 1, or the specified number is greater than 1 and smaller than or equal to the total number.

As can be seen from the examples, if the total number of second transmission positions in the available state is one, the information on the HARQ feedback is sent to the base station at that second transmission position; and if the total number of second transmission positions in available state is more than one, a specified number of second transmission positions are selected from the more than one second transmission positions, and the information on the HARQ feedback are sent to the base station at the selected one or more second transmission positions, thereby providing security of information feedback and improving practicability of the information feedback.

Figure 15:
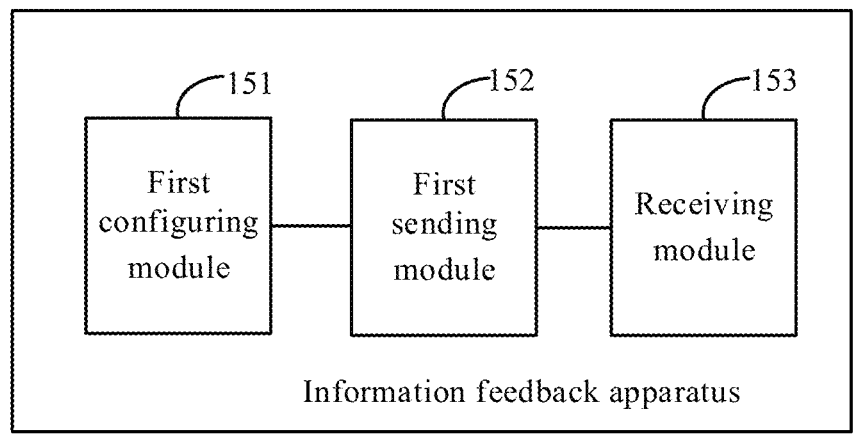
FIG. 15 is a block diagram illustrating an information feedback apparatus according to an example.

FIG. 15 is a block diagram illustrating an information feedback apparatus according to an example. The apparatus is applicable to a base station which configures a plurality of unlicensed channel resources for a terminal, and performs the information feedback method shown in FIG. 7. As shown in FIG. 15, the information feedback apparatus may include the following modules.

A first configuring module 151 is configured to configure a scheduling instruction for the terminal, where the scheduling instruction carries information for the terminal to determine a first transmission position for feeding back an HARQ, and the first transmission position is on a first unlicensed channel resource.

A first sending module 152 is configured to send the scheduling instruction to the terminal, such that the terminal sends information on HARQ feedback to the base station at a second transmission position in response to that the first transmission position determined by the scheduling instruction is detected to be in a non-available state and the second transmission position determined for feeding back the HARQ is in an available state, where the second transmission position is on a second unlicensed channel resource.

A receiving module 153 is configured to receive the information on the HARQ feedback from the terminal.

As can be seen from the examples, a scheduling instruction is configured for the terminal and sent to the terminal, such that the terminal can send information on HARQ feedback to the base station at a second transmission position when a first transmission position determined by the scheduling instruction is detected to be in a non-available state and the second transmission position determined for feeding back the HARQ is in an available state, where the second transmission position is on the second unlicensed channel resource. In this way, information feedback on an unlicensed channel resource is realized and reliability of the information feedback is improved.

In an example, based on the apparatus shown in FIG. 15, the plurality of unlicensed channel resources include a plurality of BWPs configured on one unlicensed carrier, a plurality of unlicensed carriers, or a plurality of BWPs configured on a plurality of unlicensed carriers.

In an example, based on the apparatus shown in FIG. 15, the scheduling instruction includes first time domain position information and/or first frequency domain position information configured for the terminal by the base station to indicate the second transmission position. In an example, the first time domain position information and/or the first frequency domain position information locates at a fixed or configurable position of the scheduling instruction; and the first time domain position information and/or the first frequency domain position information has a fixed or configurable length of information bits.

Figure 16:
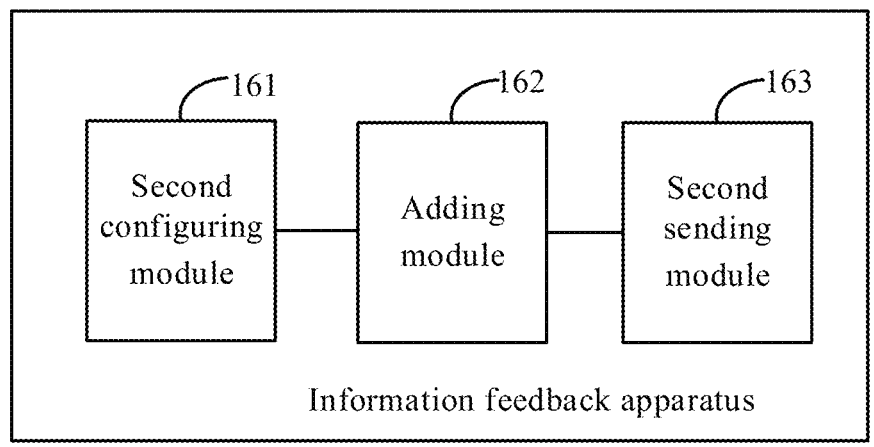
FIG. 16 is a block diagram illustrating another information feedback apparatus according to an example.

In an example, based on the apparatus shown in FIG. 15, as shown in FIG. 16, the apparatus further includes the following modules.

A second configuring module 161 is configured to configure a set rule for the terminal, where the set rule includes a first correspondence between second unlicensed channel resource and specified time length, and a specified time length refers to a time interval between the first transmission position on the first unlicensed channel resource for the HARQ feedback and the second transmission position on the second unlicensed channel resource for HARQ backup feedback.

An adding module 162 is configured to add the set rule to a system message or specified signaling.

A second sending module 163 is configured to send the system message or the specified signaling to the terminal, such that the terminal obtains the set rule from the system message or the specified signaling.

In an example, based on the apparatus shown in FIG. 16, the set rule further includes a second correspondence between second unlicensed channel resource and specified frequency offset value, and a specified frequency offset value refers to a frequency domain offset value between the first transmission position on the first unlicensed channel resource for the HARQ feedback and the second transmission position on the second unlicensed channel resource for the HARQ backup feedback.

As can be seen from the examples, the set rule is configured for the terminal and then added to the system message or the specified signaling which is then sent to the terminal. In this case, the terminal can obtain the set rule from the system message or the specified signaling, and further determine the second transmission position on the second unlicensed channel resource for HARQ backup feedback according to the set rule, thereby improving the reliability of information feedback.

In an example, based on the apparatus shown in FIG. 16, the specified signaling may include at least one of: RRC signaling, MAC-CE signaling, or physical layer signaling.

Since the apparatus examples substantially correspond to the method examples, a reference may be made to part of the descriptions of the method examples for the related part. The apparatus examples described above are merely illustrative, where the units described as separate members may be or not be physically separated, and components displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, the present disclosure further provides a non-transitory computer readable storage medium storing a computer program. The computer program is used to implement the information feedback method according to any one of the above FIGS. 1-6.

Correspondingly, the present disclosure further provides a non-transitory computer readable storage medium storing a computer program. The computer program is used to implement the information feedback method according to the above FIGS. 7-8.

Correspondingly, the present disclosure further provides an information feedback apparatus, and the apparatus is applicable to a terminal for which a base station configures a plurality of unlicensed channel resources. The apparatus includes:
 a processor, and
 a memory storing instructions executable by the processor,
 where the processor is configured to:
 receive a scheduling instruction from the base station, where the scheduling instruction carries information for the terminal to determine a first transmission position for feeding back an HARQ, and the first transmission position is on a first unlicensed channel resource;
 obtain the first transmission position according to the scheduling instruction, and detecting whether the first transmission position is in an available state;
 in response to detecting the first transmission position is in a non-available state, determine a second transmission position for feeding back the HARQ, where the second transmission position is on a second unlicensed channel resource; and
 in response to detecting the second transmission position is in the available state, send information on HARQ feedback to the base station at the second transmission position.

Figure 17:
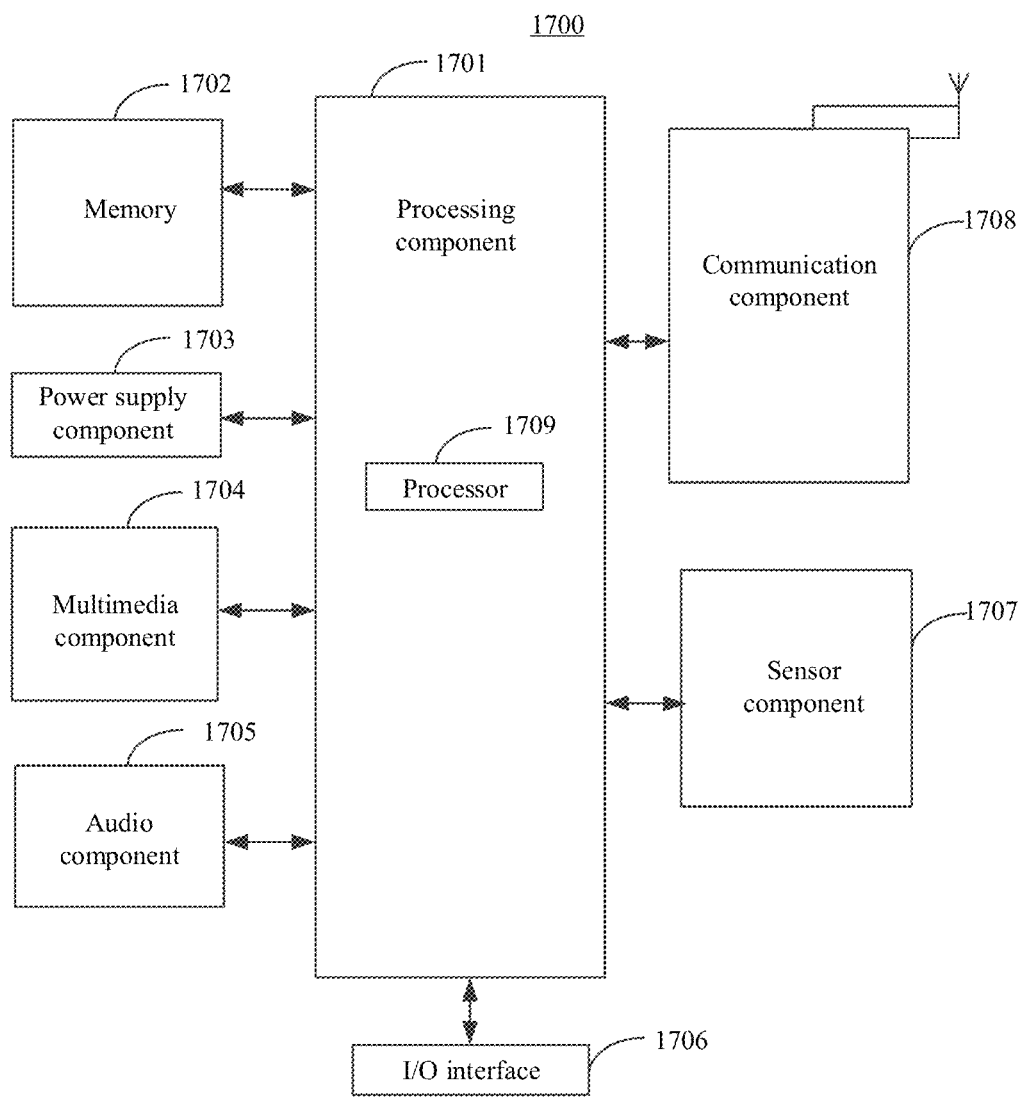
FIG. 17 is a structural schematic diagram illustrating an information feedback apparatus according to an example.

FIG. 17 is a structural schematic diagram illustrating an information feedback apparatus according to an example. As shown in FIG. 17, the information feedback apparatus 1700 according to an example may be a terminal, such as, a computer, a mobile phone, a digital broadcast terminal, a message transceiver, a game console, a tablet device, a medical device, a fitness device and a personal digital assistant, and the like.

Referring to FIG. 17, the apparatus 1700 may include one or more of components: a processing component 1701, a memory 1702, a power supply component 1703, a multimedia component 1704, an audio component 1705, an input/output (I/O) interface 1706, a sensor component 1707, and a communication component 1708.

The processing component 1701 generally controls overall operations of the control apparatus 1700, such as operations associated with display, phone calls, data communications, camera operations, and recording operations. The processing component 1701 may include one or more processors 1709 to execute instructions to complete all or part of the steps of the above methods. In addition, the processing component 1701 may include one or more modules which facilitate the interaction between the processing component 1701 and other components. For example, the processing component 1701 may include a multimedia module to facilitate the interaction between the multimedia component 1704 and the processing component 1701.

The memory 1702 is configured to store various types of data to support the operation of the control apparatus 1700. Examples of such data include instructions for any application or method operated on the apparatus 1700, contact data, phonebook data, messages, pictures, videos, and so on. The memory 1702 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 1703 supplies power for different components of the apparatus 1700. The power supply component 1703 may include a power supply management system, one or more power supplies, and other components associated with generating, managing and distributing power for the apparatus 1700.

The multimedia component 1704 includes a screen that provides an output interface between the apparatus 1700 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1704 includes a front camera and/or a rear camera. When the apparatus 1700 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1705 is configured to output and/or input audio signals. For example, the audio component 1705 includes a microphone (MIC) configured to receive an external audio signal when apparatus 1700 is in an operation mode, such as a call mode, a recording mode, and a voice recognition mode. The received audio signal may be further stored in the memory 1702 or transmitted via the communication component 1708. In some examples, the audio component 1705 also includes a loudspeaker for outputting an audio signal.

The I/O interface 1706 provides an interface between the processing component 1701 and a peripheral interface module, which may be a keyboard, a click wheel, a button, or the like. These buttons may include, but are not limited to a home button, a volume button, a start button, and a lock button.

The sensor component 1707 includes one or more sensors for providing a status assessment in various aspects to the apparatus 1700. For example, the sensor component 1707 may detect an open/closed state of the apparatus 1700, and the relative positioning of components, for example, the component is a display and a keypad of the apparatus 1700. The sensor component 1707 may also detect a change in position of the apparatus 1700 or a component of the apparatus 1700, the presence or absence of a user in contact with the apparatus 1700, the orientation or acceleration/deceleration of the apparatus 1700 and a change in temperature of the apparatus 1700. The sensor component 1707 may include a proximity sensor configured to detect the presence of nearby objects without any physical contact. The sensor component 1707 may also include a light sensor, such as a CMOS or CCD image sensor, for use in imaging applications. In some examples, the sensor component 1707 may also include an acceleration sensor, a gyro sensor, a magnetic sensor, a pressure sensor, or a temperature sensor.

The communication component 1708 is configured to facilitate wired or wireless communication between the apparatus 1700 and other devices. The apparatus 1700 may access a wireless network based on a communication standard, such as Wi-Fi, 2G or 3G, or a combination thereof. In an example, the communication component 1708 receives broadcast signals or broadcast associated information from an external broadcast management system via a broadcast channel. In an example, the communication component 1708 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth® (BT) technology, and other technologies.

In an example, the apparatus 1700 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the above methods.

In an example, there is also provided a non-transitory computer readable storage medium including instructions, such as a memory 1702 including instructions, where the instructions are executable by the processor 1709 of the apparatus 1700 to perform the method as described above. For example, the non-transitory computer readable storage medium may be a random access memory (RAM), a read only memory (ROM), a CD-ROM, a magnetic tape, a floppy disk, an optical data storage device, and the like.

When the instructions in the storage medium are executed by the processor, the apparatus 1700 is capable of performing any one of the information feedback methods described above.

Correspondingly, the present disclosure further provides an information feedback apparatus, and the apparatus is applicable to a base station which configures a plurality of unlicensed channel resources for a terminal. The apparatus includes:
  a processor, and
  a memory storing instructions executable by the processor,
  where the processor is configured to:

configure a scheduling instruction for the terminal, where the scheduling instruction carries information for the terminal to determine a first transmission position for feeding back an HARQ, and the first transmission position is on a first unlicensed channel resource;

send the scheduling instruction to the terminal, such that the terminal sends information on HARQ feedback to the base station at a second transmission position in response to that the first transmission position determined by the scheduling instruction is detected to be in a non-available state and the second transmission position determined for feeding back the HARQ is in an available state, where the second transmission position is on a second unlicensed channel resource; and receive the information on the HARQ feedback from the terminal.

Figure 18:
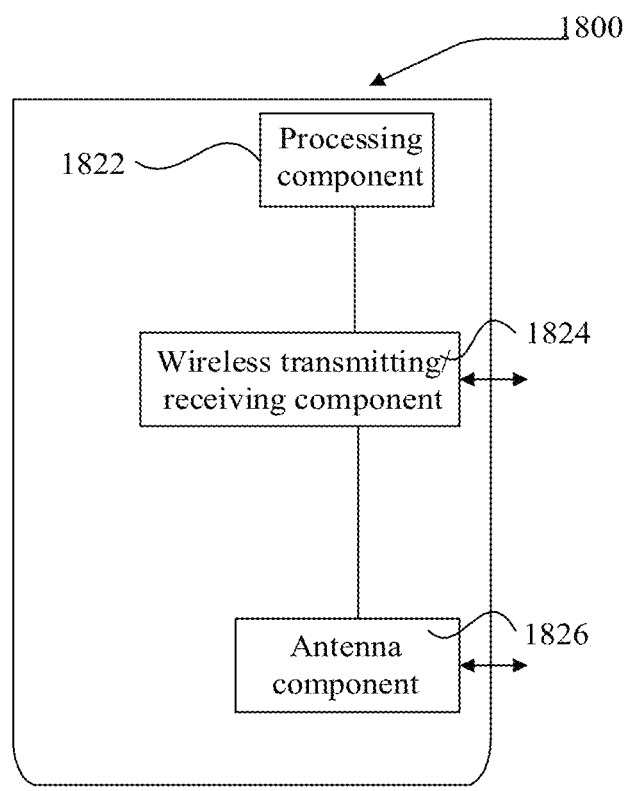
FIG. 18 is a structural schematic diagram illustrating an information feedback apparatus according to an example.

FIG. 18 is a structural schematic diagram illustrating an information feedback apparatus according to an example. The apparatus 1800 may be provided as a base station. Referring to FIG. 18, the apparatus 1800 includes a processing component 1822, a wireless transmission/receiving component 1824, an antenna component 1826, and a signal processing part specific to wireless interface. The processing component 1822 may further include one or more processors.

One or more processors of the processing component 1822 are configured to perform any one of the information feedback methods described above.

The technical solutions of the examples of the present disclosure may include the following beneficial effects.

In the present disclosure, a terminal can determine a second transmission position for feeding back HARQ when a first transmission position obtained by the scheduling instruction for feeding back the HARQ is detected to be in a non-available state, where the first transmission position is on a first unlicensed channel resource and the second transmission position is on a second unlicensed channel resource. Further, when detecting the second transmission position is in an available state, the terminal sends information on HARQ feedback to a base station at the second transmission position, thereby realizing information feedback on an unlicensed channel resource and improving reliability of the information feedback.

In the present disclosure, a base station can configure a scheduling instruction for a terminal and send the scheduling instruction to the terminal. Thus, the terminal can send information on HARQ feedback to the base station at a second transmission position when a first transmission position determined by the scheduling instruction is detected to be in a non-available state and the second transmission position determined for feeding back the HARQ is in an available state, where the second transmission position is on the second unlicensed channel resource. In this way, information feedback on an unlicensed channel resource is realized and reliability of the information feedback is improved.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An information feedback method, comprising:
receiving, by a terminal, a scheduling instruction from a base station, wherein the terminal is configured with a plurality of unlicensed channel resources by the base station, the scheduling instruction carries information for the terminal to determine a first transmission position for feeding back a hybrid automatic repeat request (HARQ), and the first transmission position is on a first unlicensed channel resource;
obtaining, by the terminal, the first transmission position according to the scheduling instruction, and detecting, by the terminal, whether the first transmission position is in an available state;
determining, by the terminal, a second transmission position for feeding back the HARQ in response to detecting that the first transmission position is in a non-available state, wherein the second transmission position is on a second unlicensed channel resource; and
sending, by the terminal, information on HARQ feedback to the base station at the second transmission position in response to detecting that the second transmission position is in the available state.

2. The method according to claim 1, wherein the scheduling instruction comprises first time domain position information, first frequency domain position information, or the first time domain position information and the first frequency domain position information configured for the terminal by the base station to indicate the second transmission position; and
the method further comprises:
determining the second transmission position according to the first time domain position information, the first frequency domain position information, or the first time domain position information and the first frequency domain position information comprised in the scheduling instruction.

3. The method according to claim 2, wherein
at least one of following information: the first time domain position information or the first frequency domain position information locates at a fixed or configurable position of the scheduling instruction; and
at least one of following information: the first time domain position information or the first frequency domain position information has a fixed or configurable length of information bits.

4. The method according to claim 1, further comprising:
determining the second transmission position according to a set rule.

5. The method according to claim 4, wherein the set rule comprises a first correspondence between the second unlicensed channel resource and a specified time length, and the specified time length refers to a time interval between the first transmission position on the first unlicensed channel resource for the HARQ feedback and the second transmission position on the second unlicensed channel resource for HARQ backup feedback; and
the method further comprises:
obtaining second time domain position information for determining the second transmission position according to the first correspondence; and
determining the second transmission position according to the obtained second time domain position information.

6. The method according to claim 5, wherein the set rule further comprises a second correspondence between the second unlicensed channel resource and a specified frequency offset value, and the specified frequency offset value refers to a frequency domain offset value between the first transmission position on the first unlicensed channel resource for the HARQ feedback and the second transmission position on the second unlicensed channel resource for the HARQ backup feedback; and
wherein the method further comprises:
obtaining second frequency domain position information for determining the second transmission position according to the second correspondence; and
determining the second transmission position according to the obtained second time domain position information and the obtained second frequency domain position information.

7. The method according to claim 4, wherein
the set rule is predefined, or
the set rule is configured by the base station for the terminal and notified to the terminal via a system message or specified signaling, and the specified signaling comprises at least one of following signaling:
radio resource control (RRC) signaling,
medium access control-control element (MAC-CE) signaling, or
physical layer signaling.

8. The method according to claim 1, further comprising:
in response to determining that there is one second transmission position in the available state, sending the information on the HARQ feedback to the base station at the second transmission position; and
in response to determining that there are a plurality of second transmission positions in the available state, selecting a specified number of second transmission positions from the plurality of second transmission positions and sending the information on the HARQ feedback to the base station at the selected second transmission position, wherein the specified number is 1, or the specified number is greater than 1 and smaller than or equal to a total number of the plurality of second transmission positions.

9. An information feedback method, comprising:
configuring, by a base station, a scheduling instruction for a terminal, wherein the base station configures a plurality of unlicensed channel resources for the terminal, the scheduling instruction carries information for the terminal to determine a first transmission position for feeding back a hybrid automatic repeat request (HARQ), and the first transmission position is on a first unlicensed channel resource;
sending, by the base station, the scheduling instruction to the terminal, such that the terminal sends information on HARQ feedback to the base station at a second transmission position in response to determining that the first transmission position determined by the scheduling instruction is detected to be in a non-available state and the second transmission position determined for feeding back the HARQ is in an available state, wherein the second transmission position is on a second unlicensed channel resource; and receiving, by the base station, the information on the HARQ feedback from the terminal.

10. The method according to claim 9, wherein the scheduling instruction comprises first time domain position information, first frequency domain position information, or the first time domain position information and the first frequency domain position information configured for the terminal by the base station to indicate the second transmission position.

11. The method according to claim 10, wherein
at least one of following information: the first time domain position information or the first frequency domain position information locates at a fixed or configurable position of the scheduling instruction; and
at least one of following information: the first time domain position information or the first frequency domain position information has a fixed or configurable length of information bits.

12. The method according to claim 10, further comprising:
configuring a set rule for the terminal, wherein the set rule comprises a first correspondence between the second unlicensed channel resource and a specified time length, and theft specified time length refers to a time interval between the first transmission position on the first unlicensed channel resource for the HARQ feedback and the second transmission position on the second unlicensed channel resource for HARQ backup feedback;
adding the set rule to a system message or specified signaling; and
sending the system message or the specified signaling to the terminal, such that the terminal obtains the set rule from the system message or the specified signaling.

13. The method according to claim 12, wherein the set rule further comprises a second correspondence between the second unlicensed channel resource and a specified frequency offset value, and theft specified frequency offset value refers to a frequency domain offset value between the first transmission position on the first unlicensed channel resource for the HARQ feedback and the second transmission position on the second unlicensed channel resource for the HARQ backup feedback.

14. The method according to claim 12, wherein the specified signaling comprises at least one of following signaling:
radio resource control (RRC) signaling,
medium access control-control element (MAC-CE) signaling, or physical layer signaling.

15. An information feedback apparatus, comprising:
a processor, and
a memory storing instructions executable by the processor,
wherein the processor is configured to:
receive a scheduling instruction from a base station, wherein the scheduling instruction carries information for a terminal to determine a first transmission position for feeding back a hybrid automatic repeat request (HARQ), and the first transmission position is on a first unlicensed channel resource;
obtain the first transmission position according to the scheduling instruction, and detecting whether the first transmission position is in an available state;
in response to detecting that the first transmission position is in a non-available state, determine a second transmission position for feeding back the HARQ, wherein the second transmission position is on a second unlicensed channel resource; and
in response to detecting that the second transmission position is in the available state, send information on HARQ feedback to the base station at the second transmission position.

16. The apparatus according to claim 15, wherein the processor is further configured to:
determine the second transmission position according to a set rule.

17. The apparatus according to claim 16, wherein the set rule comprises a first correspondence between the second unlicensed channel resource and a specified time length, and the specified time length refers to a time interval between the first transmission position on the first unlicensed channel resource for the HARQ feedback and the second transmission position on the second unlicensed channel resource for HARQ backup feedback; and
wherein the processor is further configured to:
obtain second time domain position information for determining the second transmission position according to the first correspondence; and
determine the second transmission position according to the obtained second time domain position information.

18. The apparatus according to claim 17, wherein the set rule further comprises a second correspondence between the second unlicensed channel resource and a specified frequency offset value, and the specified frequency offset value refers to a frequency domain offset value between the first transmission position on the first unlicensed channel resource for the HARQ feedback and the second transmission position on the second unlicensed channel resource for the HARQ backup feedback; and
wherein the processor is further configured to:
obtain second frequency domain position information for determining the second transmission position according to the second correspondence; and
determine the second transmission position according to the obtained second time domain position information and the obtained second frequency domain position information.

19. The apparatus according to claim 15, wherein the processor is further configured to:
in response to determining that there is one second transmission position in the available state, send the information on the HARQ feedback to the base station at the second transmission position; and
in response to determining that there are a plurality of second transmission positions in the available state, select a specified number of second transmission positions from the plurality of second transmission positions and send the information on the HARQ feedback to the base station at the selected second transmission position, wherein the specified number is 1, or the specified number is greater than 1 and smaller than or equal to a total number of the plurality of second transmission positions.

* * * * *